United States Patent
Matsuki et al.

(10) Patent No.: US 9,124,840 B2
(45) Date of Patent: Sep. 1, 2015

(54) IMAGE PROCESSING FOR FACILITATING IDENTIFICATION OF COLORS USING PATTERNED REGIONS

(71) Applicant: Kyocera Document Solutions Inc., Osaka (JP)

(72) Inventors: Yoshitaka Matsuki, Osaka (JP); Satoshi Kawakami, Osaka (JP); Wataru Endo, Osaka (JP); Masato Tanba, Osaka (JP); Yosuke Nakazato, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/332,403

(22) Filed: Jul. 16, 2014

(65) Prior Publication Data
US 2015/0036152 A1  Feb. 5, 2015

(30) Foreign Application Priority Data

Jul. 30, 2013 (JP) ................................ 2013-158101
Oct. 28, 2013 (JP) ................................ 2013-223600

(51) Int. Cl.
*H04N 1/40* (2006.01)
*H04N 1/56* (2006.01)

(52) U.S. Cl.
CPC ................................ *H04N 1/40012* (2013.01)

(58) Field of Classification Search
None
See application file for complete search history.

(56) References Cited

U.S. PATENT DOCUMENTS

| | | | | |
|---|---|---|---|---|
| 4,369,461 A * | 1/1983 | Tamura | ........................ | 358/500 |
| 4,688,031 A * | 8/1987 | Haggerty | .................... | 358/3.26 |
| 4,703,318 A * | 10/1987 | Haggerty | ..................... | 345/634 |
| 5,153,576 A * | 10/1992 | Harrington | .................. | 358/520 |
| 5,557,430 A * | 9/1996 | Isemura et al. | ............... | 358/501 |
| 5,701,401 A * | 12/1997 | Harrington et al. | ............ | 358/1.9 |
| 6,169,607 B1 * | 1/2001 | Harrington | .................... | 358/1.9 |
| 6,179,485 B1 * | 1/2001 | Harrington | .................... | 358/1.9 |
| 7,440,138 B2 * | 10/2008 | Hofman | ....................... | 358/500 |
| 7,453,468 B2 * | 11/2008 | Ziobro | ......................... | 345/596 |
| 7,502,135 B2 * | 3/2009 | Noel | ............................ | 358/1.15 |
| 7,706,033 B2 * | 4/2010 | Kadota | ........................ | 358/520 |
| 7,835,031 B2 * | 11/2010 | Roome et al. | .................. | 358/1.9 |
| 8,422,071 B2 * | 4/2013 | Shimamura et al. | ........... | 358/1.9 |
| 2011/0090237 A1 * | 4/2011 | Shimamura et al. | .......... | 345/589 |

FOREIGN PATENT DOCUMENTS

| | | | |
|---|---|---|---|
| JP | 2001-268378 A | 9/2001 |
| JP | 2006-186914 A | 7/2006 |
| JP | 2008-005064 A | 1/2008 |
| JP | 2008-005065 A | 1/2008 |

* cited by examiner

*Primary Examiner* — Scott A Rogers
(74) *Attorney, Agent, or Firm* — James W. Judge

(57) ABSTRACT

An image processing apparatus includes an image region determining unit, an image color determining unit, and a change processor. The image region determining unit is configured to determine a colored region where an inside of an outline is filled with a single color from color image data. The image color determining unit is configured to determine a color of the colored region determined by the image region determining unit. The change processor is configured to change the colored region determined by the image region determining unit to a patterned region with a pattern different in each of the colors determined by the image color determining unit.

7 Claims, 8 Drawing Sheets

IMAGE PROCESSING FOR FACILITATING IDENTIFICATION OF COLORS USING PATTERNED REGIONS

CROSS-REFERENCE TO RELATED APPLICATION

This application is based upon, and claims the benefit of priority from, corresponding Japanese Patent Application No. 2013-158101 filed in the Japan Patent Office on Jul. 30, 2013, and Japanese Patent Application No. 2013-223600 filed in the Japan Patent Office on Oct. 28, 2013, the entire contents of which are incorporated herein by reference.

BACKGROUND

Unless otherwise indicated herein, the description in this section is not prior art to the claims in this application and is not admitted to be prior art by inclusion in this section.

In an output process of color image data, it may be difficult to identify difference of colors of an object such as a table and a graph presumed to be identified by difference of colors (color coding) depending on an output destination.

This occurs, for example, when a color image displayed on a monitor of a personal computer or a similar device is printed in a single color or when the color image is projected on a screen with a projector apparatus.

When the color image is printed in a single color, for example, monochrome, the difference of colors cannot be identified depending on expressive power and performance of an image forming apparatus. When the color image is sent to the projector apparatus to project the color image on the screen, a tint on the screen differs from a tint on the monitor, thus failing to identify the difference of colors. Both cases may have a problem of incorrect transmission of information.

As a technique for preventing such incorrect transmission of information, style information according to color information is added to characters in data and the image data is converted when performing monochrome print from color image data. This technique ensures recognizing character colors with styles adding hatching, an underline, or an enclosure line, thus ensuring preventing incorrect transmission of information.

However, the technique cannot be applied to figures such as tables and graphs with no style information.

On the other hand, the following techniques are also available. For a pie chart of color image with a plurality of colored regions, print densities are differentiated among the colored regions. Additionally, there is a technique that detects a color boundary portion at which colored regions of different colors are in contact with one another on a color image and distinguishes the color boundary portion, for example, on a monochrome image.

However, the all above-described techniques do not consider performance of the output destination of the color image. Accordingly, solving the difficulty in seeing a boundary between the colored regions of the color image that varies depending on the output destination is still insufficient.

SUMMARY

An image processing apparatus according to the disclosure includes an image region determining unit, an image color determining unit, and a change processor. The image region determining unit is configured to determine a colored region where an inside of an outline is filled with a single color from color image data. The image color determining unit is configured to determine a color of the colored region determined by the image region determining unit. The change processor is configured to change the colored region determined by the image region determining unit to a patterned region with a pattern different in each of the colors determined by the image color determining unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
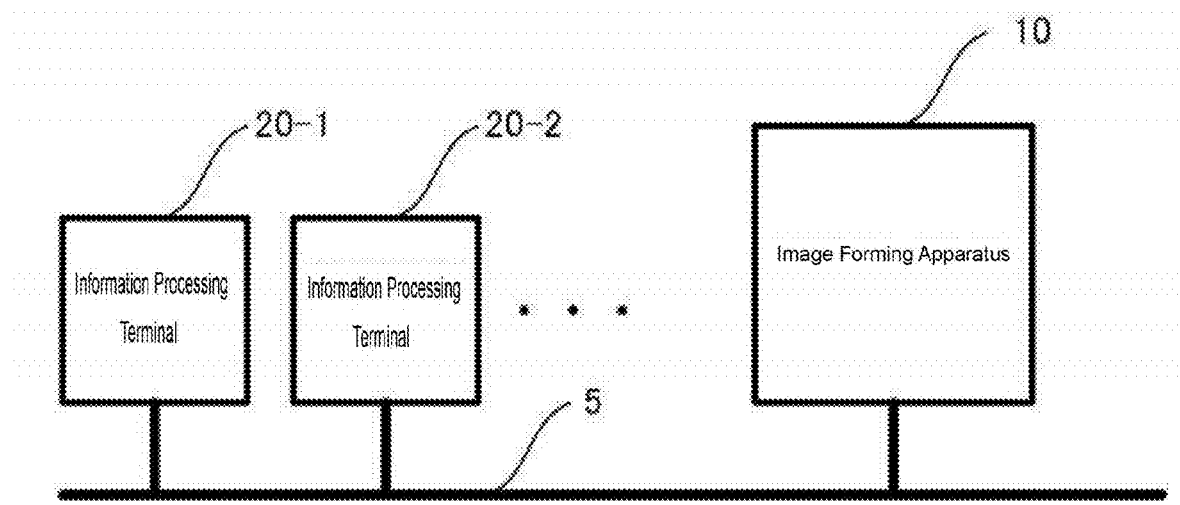
FIG. 1 illustrates a configuration of a system that includes an image forming apparatus according to Embodiment 1.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

To output a figure based on color image data, an object that ensures identifying a color coding of the figure regardless of an output destination can be achieved by the following image processing apparatus. The image processing apparatus changes a colored region of the color image data where the inside of outline is filled with a single color to a patterned region. The patterned regions have different patterns depending on colors.

The output destination includes an image forming apparatus that performs print output, for example, a figure as a single color image, a projector apparatus that projects and outputs a figure on a screen as a color image, or a similar apparatus.

The image processing apparatus can be located, for example, at the image forming apparatus and the projector apparatus, which become the output destination, or is applicable to an information processor that transmits the color image data to the output destination, or a similar apparatus.

The following describes embodiments of the disclosure with reference to the accompanying drawings.

Image Forming Apparatus According to Embodiment 1

Figure 2:
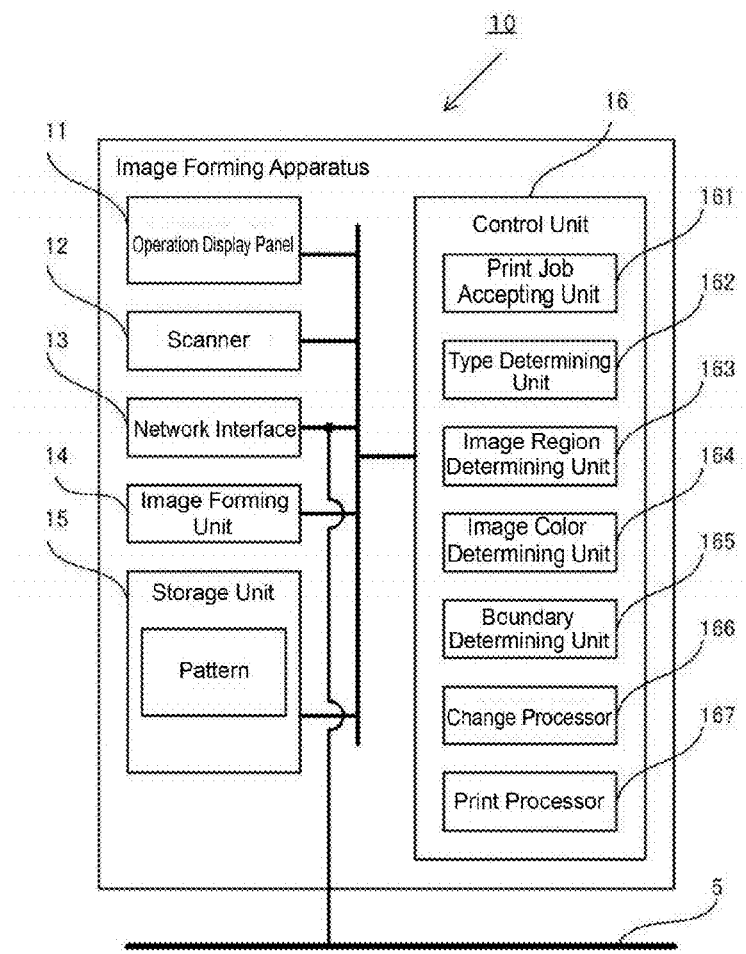
FIG. 2 illustrates a configuration of the image forming apparatus according to Embodiment 1.

This embodiment employs an image processing apparatus as an image forming apparatus. FIG. 1 illustrates a configuration of a system that includes an image forming apparatus according to Embodiment 1 of the disclosure. FIG. 2 illustrates a configuration of the image forming apparatus of FIG. 1.

In the embodiment, as illustrated in FIG. 1, an image forming apparatus 10, which is an image processing apparatus, is connected to a plurality of information processing terminals 20 (for convenience, FIG. 1 illustrates only information processing terminals 20-1 and 20-2) over a network 5 such as the Internet.

The image forming apparatus 10, for example, is a digital multi-functional peripheral. The image forming apparatus 10 has a single color print function that prints color image data in a single color. The single color printing is a printing representing tones using shading of a single color. The single color printing includes a monochrome printing and a color printing with a single color.

The image forming apparatus 10, as illustrated in FIG. 2, includes an operation display panel 11, a scanner 12, a network interface 13, an image forming unit 14, a storage unit 15, a control unit 16, or a similar unit.

The operation display panel 11 includes a touch-panel liquid crystal display screen or a similar screen. Various input operations to the image forming apparatus 10 are performed from the operation display panel 11, and the operation display panel 11 also displays the input results, or performs a similar operation.

The scanner 12 reads a document image formed on a paper sheet to generate image data.

The network interface 13 transmits/receives data to/from external devices including the information processing terminal 20 via the network 5.

The image forming unit 14 forms an image on a paper sheet based on a print job. The print job is accepted through an operation on the operation display panel 11, or is received from the information processing terminal 20 via the network interface 13. The print job of the embodiment instructs single color printing based on color image data.

The color image data for the print job includes color image data read by the scanner 12, color image data generated by the information processing terminal 20, color image data stored in the storage unit 15, which will be described later, or similar color image data. The color image data stored in the storage unit 15 is a color box document or a similar document stored in, for example, a storage region referred to as a document box.

The control unit 16 is an arithmetic device such as a Central Processing Unit (CPU). The control unit 16 performs various processes and controls by executing programs.

The storage unit 15 is a Read Only Memory (ROM) that stores programs, a Random Access Memory (RAM) as a work area, a Hard Disk Drive (HDD) as an auxiliary storage device, or a similar unit.

Execution of the programs in the storage unit 15 by the control unit 16 causes the image forming apparatus 10 of the embodiment to operate as a print job accepting unit 161, a type determining unit 162, an image region determining unit 163, an image color determining unit 164, a boundary determining unit 165, a change processor 166, and a print processor 167.

The print job accepting unit 161 achieves a print instruction accepting function that accepts the print job. When the print job instructs the single color printing based on the color image data like the embodiment, the print job accepting unit 161 causes the type determining unit 162 to operate.

The type determining unit 162 achieves a type determining function. The type determining unit 162 determines a type of object included in the color image data of the print job and causes the image region determining unit 163 to determine a colored region of the object whose type is a figure. The colored region is a region where the inside of the outline is filled with a single color.

The image region determining unit 163 achieves an image region determining function. If the type determined by the type determining unit 162 is a figure object, the image region determining unit 163 determines the colored region from the color image data targeting the figure object.

The image color determining unit 164 achieves an image color determining function. The image color determining unit 164 determines a color of the colored region determined by the image region determining unit 163.

The boundary determining unit 165 achieves a boundary determining function. The boundary determining unit 165 determines a boundary between adjacent colored regions based on brightness and saturation of the color of the colored region determined by the image color determining unit 164.

The change processor 166 achieves a change process function. The change processor 166 changes the colored region in the color image data determined by the image region determining unit 163 to a patterned region with a pattern different in each of the colors in the colored region determined by the image color determining unit 164. The patterned region is a region where the inside of outline of the colored region is changed to a specific pattern. The patterns employed for the patterned region are stored in the storage unit 15. However, the change processor 166 can also generate the pattern of the patterned region appropriately.

The change of the colored region to the patterned region includes: replacing a colored region with a patterned region, superimposing a patterned region on a background of the colored region, or a similar change. When colored regions with different colors are adjacent, the change processor 166 of the embodiment changes (replaces) adjacent colored regions to the patterned regions. Specifically, the change processor 166 changes the adjacent colored regions to the respective patterned regions if differences in brightness and saturation of the adjacent colored regions whose boundary has been determined by a determination result by the boundary determining unit 165 are below thresholds. Thus, the change processor 166 changes the colored region in the color image data to the patterned region to generate the image data for single color printing.

Meanwhile, if the boundary is not determined, that is, if adjacent colored regions do not exist, the change processor 166 does not perform a process of changing the colored region to the patterned region (skips the process).

The print processor 167 controls the image forming unit 14 based on the image data for printing generated by the change processor 166 to cause the image forming unit 14 to form an image of the print target image data on a paper sheet.

Image Process During Single Color Printing

Figure 3:
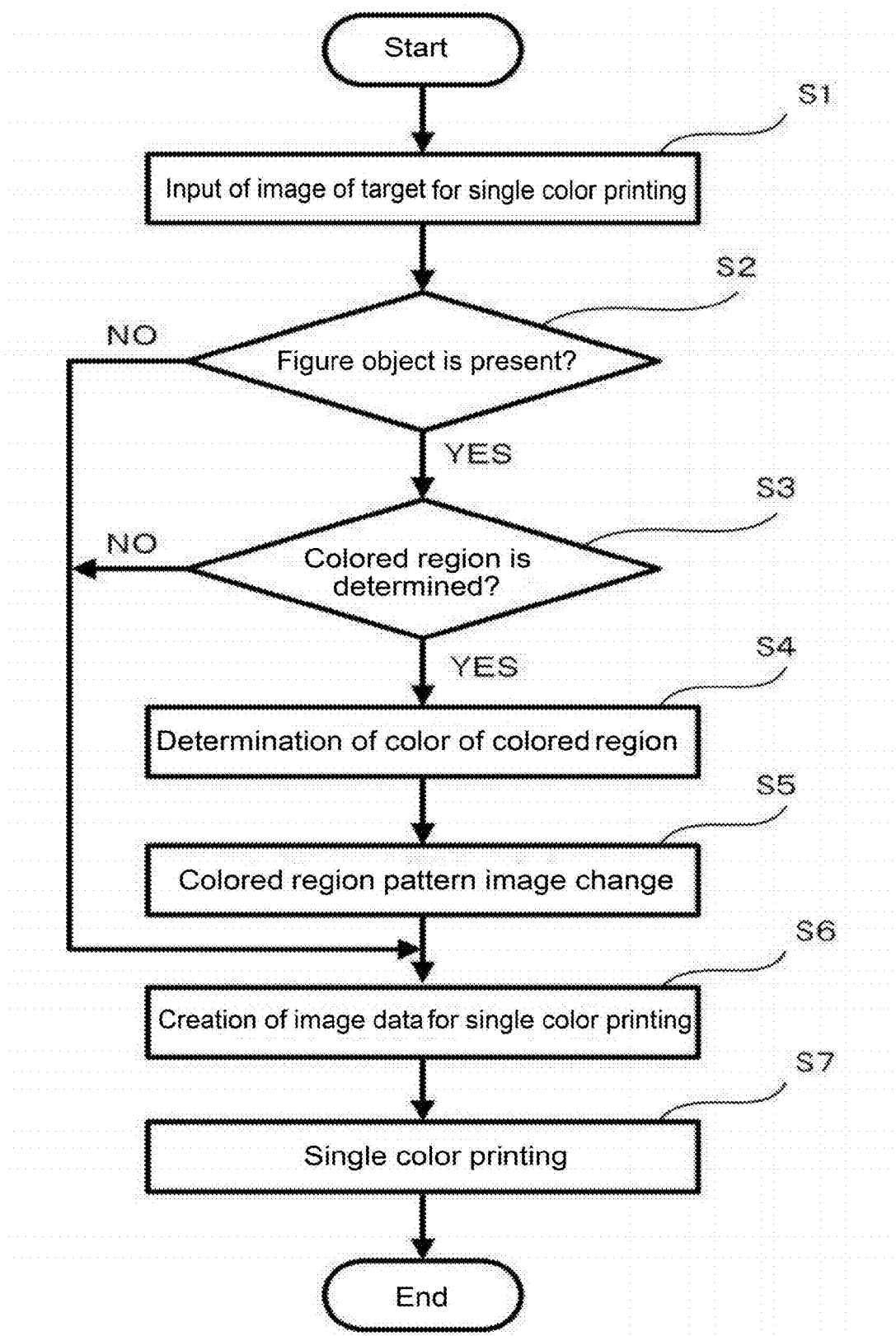
FIG. 3 illustrates steps of an image process based on a single color print instruction in the image forming apparatus according to Embodiment 1.

FIG. 3 illustrates steps of an image process based on a single color print instruction in the image forming apparatus 10. In the image process based on the single color print instruction by the image forming apparatus 10, first, at Step S1, "Image Input of single color print target" is performed. This process at Step S1 inputs the color image data via the print job accepted by the print job accepting unit 161. Thus, Step S1 is competed, and the process proceeds to Step S2.

At Step S2, "Figure object is present?" is determined. In this process at Step S2, the type determining unit 162 determines the type of object included in the input color image data. Specifically, the type determining unit 162 determines a figure object (image part such as table, data, and graph images) by distinguishing from an object such as a text and a photograph in the color image data.

If the object is a figure, the process proceeds to Step S3 (YES), if the object is other than a figure, the process proceeds to Step S6 (NO).

At Step S3, "Colored region is determined?" is performed. In this process at Step S3, the image region determining unit 163 determines the colored region targeting the figure object.

As the determination result at Step S3, if the colored region is determined, the process proceeds to Step S4 (YES), if not determined, the process proceeds to Step S6 (NO).

Figure 4:
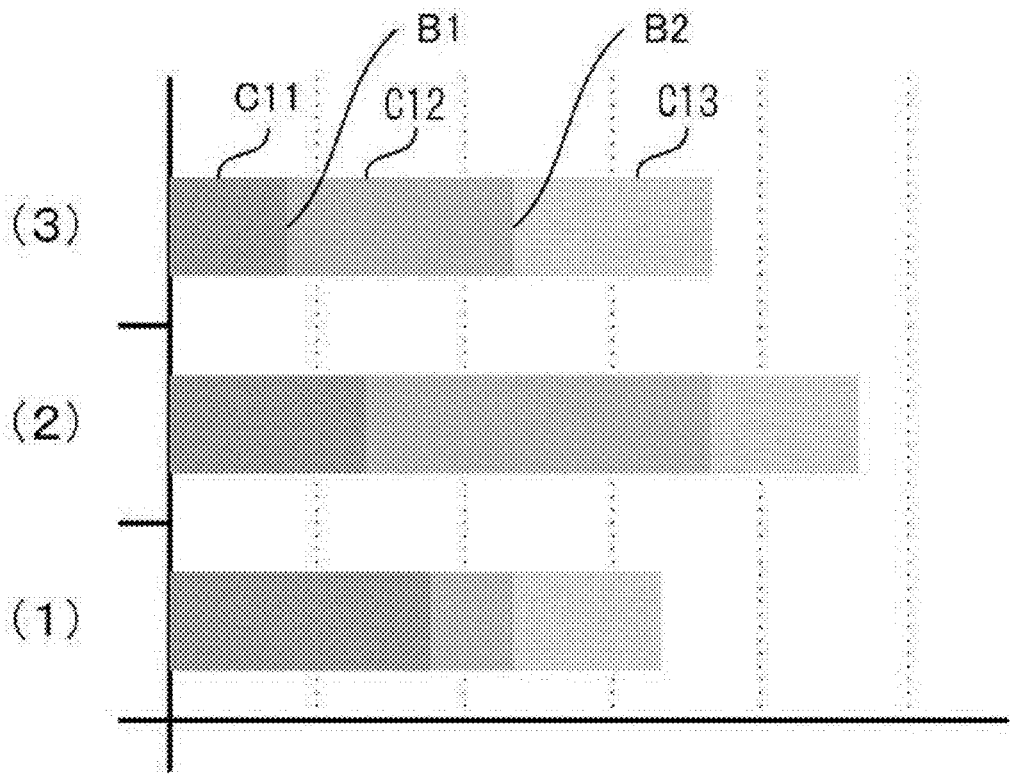
FIG. 4 illustrates a graph with colored regions to which the image process according to Embodiment 1 is to be applied.

FIG. 4 illustrates a graph as a figure object with the colored regions. In the example of FIG. 4, the image region determining unit 163 is supposed to determine colored regions C11, C12, and C13. Therefore, in this example, the process proceeds to Step S4. It is assumed that the color shadings of FIG. 4 indicate that the colored regions C11, C12, and C13 each have different chromatic colors, and when the single color printing is performed on the colored regions C11, C12, and C13, the graph changes like one illustrated in FIG. 6.

At Step S4, "Determination of color of colored region" is performed. In this process at Step S4, the image color determining unit 164 determines the colors of colored regions determined at Step S3. Then, the boundary determining unit 165 determines the boundary between the adjacent colored regions based on the brightness and the saturation of the colors of colored regions determined by the image color determining unit 164. Accordingly, when the adjacent colored regions exist, the image color determining unit 164 can determine the colors of respective colored regions. After the color determination process of colored regions is completed at Step S4, the process proceeds to Step S5.

In the example of FIG. 4, a boundary B1 between the colored regions C11 and C12 and a boundary B2 between the colored regions C12 and C13 are determined. The colored regions C11 and C12, and the colored regions C12 and C13 are each determined as adjacent colored regions. Accordingly, colors of the colored regions C11, C12, and C13 are determined, and the process proceeds to Step S5.

At Step S5, "Colored region pattern image change" is performed. In this process at Step S5, the change processor 166 changes the colored regions determined (see Step S3) by the image region determining unit 163 to the patterned regions with different patterns depending on the colors of colored regions determined by the image color determining unit 164 (see Step S4).

As described above, the embodiment changes the adjacent colored regions to the respective patterned regions if differences in the brightness and the saturation of the adjacent colored regions whose boundary has been determined are below thresholds due to the reason below. When the differences in the brightness and the saturation are equal to or more than the thresholds, color coding can be identified even in single-color-printed images.

Figure 5:
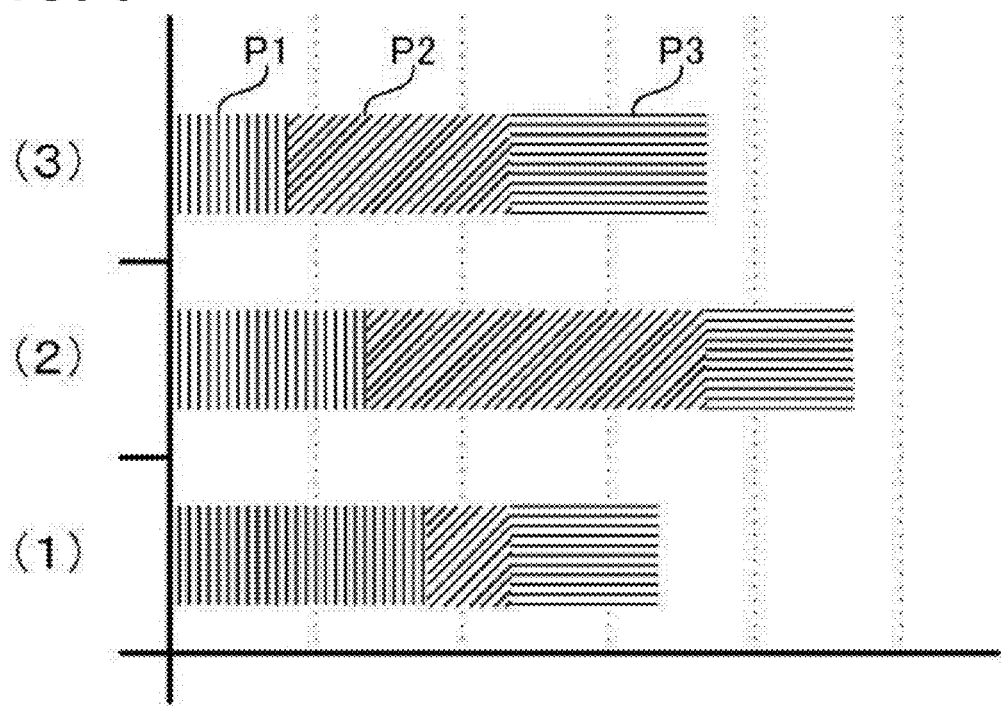
FIG. 5 illustrates a graph in which the colored regions according to Embodiment 1 are changed into patterned regions.

FIG. 5 illustrates a graph in which the colored regions of FIG. 4 are changed to the patterned regions. In the example of FIG. 5, the adjacent colored regions C11, C12, and C13 with different colors are changed to patterned regions P1, P2, and P3 with different patterns. During the change, the change processor 166 reads the patterns of the patterned regions P1, P2, and P3 from the storage unit 15. The applied patterns of the colored regions C11, C12, and C13 are replaced by the read patterns.

At this time, different patterns may be selectable according to a print density of toner employed for print. For example, even when a color document or a similar document is printed in monochrome in a toner saving mode, this configuration ensures providing a printed matter with a reduced false recognition of color identification due to degrade of tone width in monochrome caused by the toner saving.

At Step S5, it is not limited to use of the preliminary prepared patterns, and different patterns may be generated depending on the respective colors of colored regions, and the change process may be performed. Basic patterns may be stored, and every time the basic patterns may be deformed depending on the colors of colored regions for use. Thus, Step S5 is completed, the process proceeds to Step S6.

When the boundary determining unit 165 does not determine the boundary (that is, the adjacent colored regions do not exist), the change processor 166 skips the process of changing the colored regions to the patterned regions.

At Step S6, "Generation of image data for single color printing" is performed. In this process at Step S6, the change processor 166 generates the image data for single color printing. Specifically, the image data whose colored regions have been changed to patterns at Step S5 is processed to be a single color to generate the image data for single color printing. Thus, Step S6 is completed, and the process proceeds to Step S7.

At Step S7, "Single color printing" is performed. At this process at Step S7, the print processor 167 controls a print process of the image forming unit 14 based on the image data for single color printing generated at Step S6 to form a single color printing image on the paper sheet.

Comparison of Results of Single Color Printing

Figure 6:
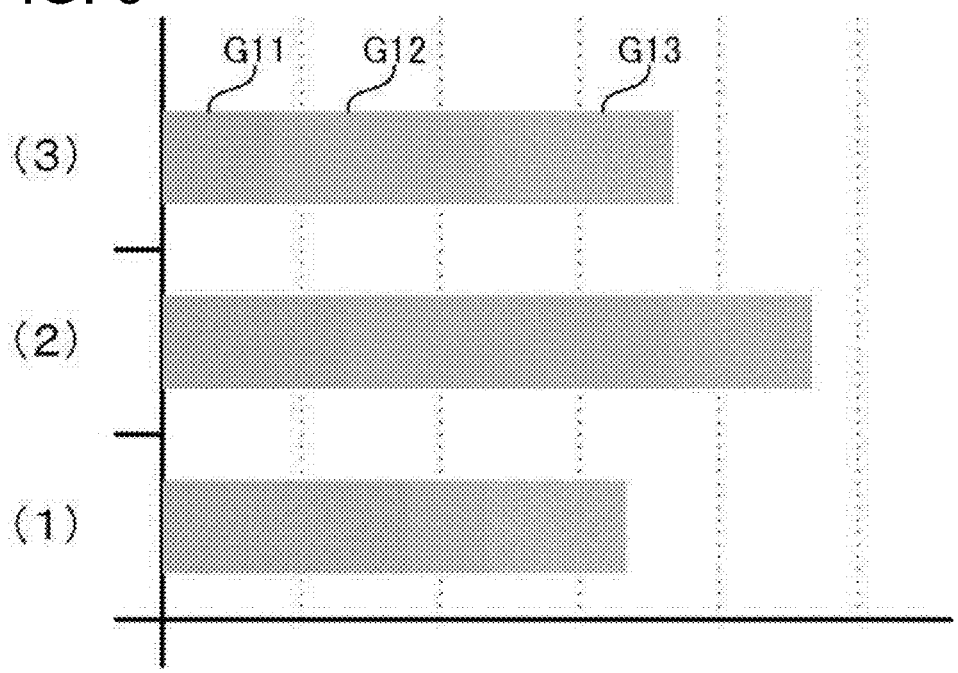
FIG. 6 illustrates a result of usual single color printing of the graph according to Embodiment 1.

FIG. 6 illustrates a result of usual single color printing of the bar graph of FIG. 4.

This embodiment changes colored regions C11, C21, and C31 with different colors, which is illustrated in 51, S2, and S3 of the bar graph of FIG. 4, to the patterned regions P1, P2, and P3 as illustrated in FIG. 5 and performs the single color printing.

As apparent from FIG. 5, in the embodiment, the difference of the original colors of the respective colored regions C11, C21, and C31, which are illustrated in 51, S2, and S3 of the bar graph of FIG. 4, can be easily identified by difference of the patterns.

In contrast to this, in FIG. 6, the image is formed with tone regions G11, G12, and G13 by single color tone. Accordingly, the difference of the original colors is difficult to be identified from the image.

Effect of Embodiment 1

The image forming apparatus 10 of the embodiment includes the image region determining unit 163, the image color determining unit 164, and the change processor 166. The image region determining unit 163 determines a colored region where an inside of an outline is filled with a single color from color image data. The image color determining unit 164 determines a color of the colored region determined by the image region determining unit 163. The change processor 166 changes the colored region determined by the image region determining unit 163 to a patterned region with a pattern different in each of the colors determined by the image color determining unit 164.

Accordingly, in the embodiment, the colored regions of print target color image data can be changed to different patterns depending on the respective colors in single color printing. Accordingly, the embodiment ensures identification by patterns without relying on the colors even in color codes of figure. That is, regardless of a color reproduction function or a similar function of output destination, the difference in patterns ensures reliably identifying the color codes of figure.

When the colored regions with different colors are adjacent, the change processor 166 changes the adjacent colored regions to the patterned regions.

Accordingly, in the embodiment, changing only the color-coded areas in the figure that need to be identified to the patterned regions ensures reducing a change of contents of the original color image data and reducing processes.

This embodiment includes the boundary determining unit 165 that determines the boundary between the adjacent colored regions based on the brightness and the saturation of colors of colored regions. The change processor 166 changes the adjacent colored regions to the respective patterned regions if the differences in brightness and saturation of the adjacent colored regions whose boundary has been determined by the boundary determining unit 165 are below the thresholds.

Therefore, the embodiment changes the colored regions to the patterned regions only when the boundary is ambiguous, this ensures more reliably reducing the change of contents of the original color image data and reducing processes.

This embodiment includes the print job accepting unit 161 that accepts the single color print instruction. Based on the single color print instruction accepted by the print job accepting unit 161, the image region determining unit 163 determines the colored regions.

Therefore, the embodiment can easily and reliably use the single color printing and the usual color printing depending on cases.

Embodiment 2

Figure 7:
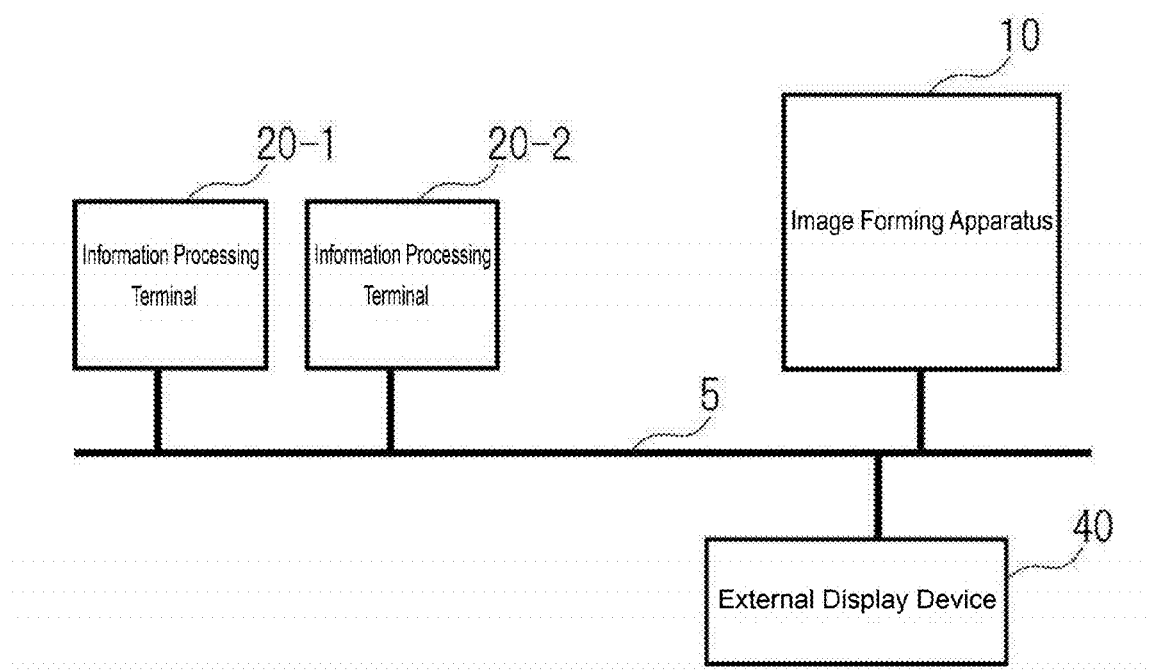
FIG. 7 illustrates a configuration of a system with an information processing terminal according to Embodiment 2.
Figure 8:
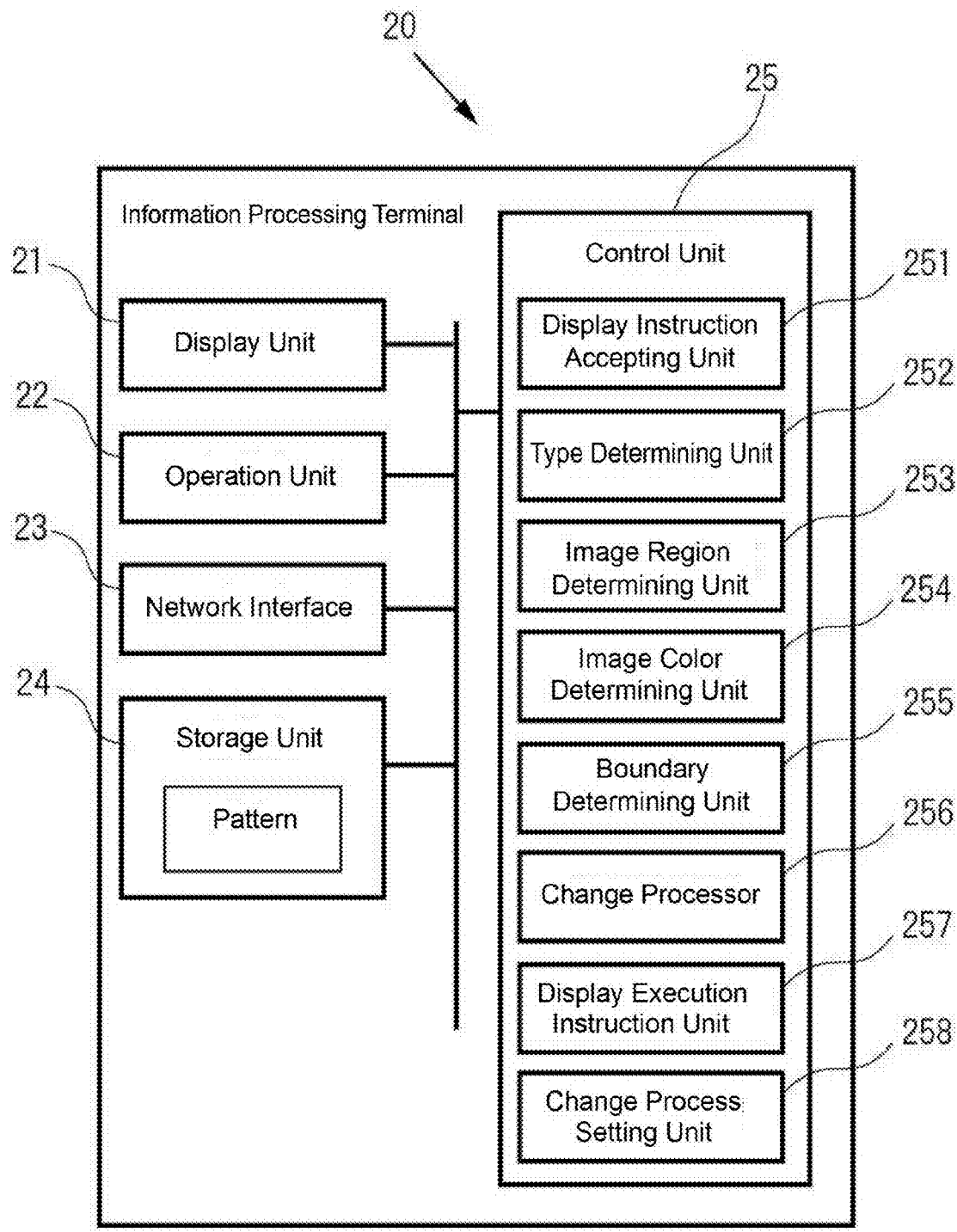
FIG. 8 illustrates a configuration of the information processing terminal according to Embodiment 2.

This embodiment applies the image processing apparatus as the information processing terminal. FIG. 7 illustrates a configuration of a system with an information processing terminal according to Embodiment 2 of the disclosure. FIG. 8 illustrates a configuration of the information processing terminal of FIG. 7.

In the embodiment, as illustrated in FIG. 7, the information processing terminal 20 (for convenience, FIG. 7 illustrates only the information processing terminals 20-1 and 20-2), which is an image processing apparatus, is connected to the image forming apparatus 10 and an external display device 40 over the network 5.

The external display device 40 is, for example, a projector apparatus. The external display device 40 projects color images on, for example, a screen, based on color image data from the information processing terminal 20. The external display device 40 can also be another display device such as a monitor.

The information processing terminal 20 of the embodiment is an information processor such as a personal computer. The information processing terminal 20 can perform various processes on the color image data. In particular, the embodiment ensures sending the color image data to the external display device 40 and causing the external display device 40 to perform display output to project color images on, for example, the screen. Alternately, the embodiment ensures performing a print instruction based on the color image data on the image forming apparatus 10 to perform print output of color images and single color images.

During this display output and print output, the information processing terminal 20 of the embodiment changes the colored regions of the figure in the color image data to the patterned regions. Both display output and print output are similar processes; therefore, the embodiment mainly describes the display output.

The information processing terminal 20, as illustrated in FIG. 8, includes a display unit 21, an operation unit 22, a network interface 23, a storage unit 24, a control unit 25, or a similar unit.

The display unit 21 is a monitor apparatus such as a liquid crystal display unit. The display unit 21 displays various information as well as monitor images based on the color image data.

The operation unit 22 includes a computer mouse, a keyboard, or a similar unit and is an input device to which various information is input.

The network interface 23 transmits/receives data to/from the external device including the image forming apparatus 10 and the external display device 40 via the network 5.

The control unit 25 is an arithmetic device such as a CPU. The control unit 25 performs various processes and controls by executing programs.

The storage unit 24 is the ROM that stores programs, the RAM as a work area, the HDD as an auxiliary storage device, or a similar unit.

Execution of the programs by the control unit 25 causes the information processing terminal 20 of the embodiment to operate as a display instruction accepting unit 251, a type determining unit 252, an image region determining unit 253, an image color determining unit 254, a boundary determining unit 255, a change processor 256, a display execution instruction unit 257, and a change process setting unit 258.

The display instruction accepting unit 251 achieves a display instruction accepting function. The display instruction accepting unit 251 accepts an output instruction of the color image data by an operation with the operation unit 22. Accordingly, in the embodiment, the instruction of display output of color images on the external display device 40 is accepted. For print output, an instruction of creating print job as the print instruction on the image forming apparatus 10 is accepted.

The type determining unit 252, the image region determining unit 253, the image color determining unit 254, and the boundary determining unit 255 have equivalent functions to the type determining function (see the type determining unit 162), the image region determining function (see the image region determining unit 163), the image color determining function (see the image color determining unit 164), and the boundary determining function (see the boundary determining unit 165) of the image forming apparatus 10 of Embodiment 1, respectively. Accordingly, descriptions of these respective units will be omitted.

Similarly to the change process function of Embodiment 1 (see the change processor 166), the change processor 256 changes the colored regions in the color image data to the patterned regions with different patterns depending on the respective colors.

However, the embodiment, for example, adds pattern information while the background color remains in the inside of the outline of colored region as the change process of the colored region to the patterned region. As the patterns to be added, hatched patterns different depending on the respective colors of the colored region and various patterns such as ruled lines and polka-dot patterns are applied. Thus, the change processor 256 adds the pattern information to the colored region in color image data to generate the color image data for external display to be displayed on the external display device 40. For print output, the print job is generated.

The display execution instruction unit 257 achieves a display execution instruction function. The display execution instruction unit 257 instructs the external display device 40 to display the color image data for external display, which is generated by the change processor 256. For print output, the display execution instruction unit 257 instructs execution of the print job to the image forming apparatus 10.

The change process setting unit 258 achieves a change process setting function. The change process setting unit 258 sets whether to perform the change process from the colored region to the patterned region by the change processor 256 or not. That is, the change process setting unit 258 switches the change process between on/off (hereinafter referred to as a "change setting"). The change setting, for example, can preliminary set execution of the change process from the colored region to the patterned region on all the color images to which the display output or the print output is to be instructed. This change setting can be performed from, for example, a setting screen displayed on the display unit 21 of the information processing terminal 20 or a similar screen.

Besides, the change setting can also timely set the change process to be performed as necessary, for example, during display of the color image by the external display device 40. This change setting can be performed by, for example, selection of a setting button displayed on the display unit 21 of the information processing terminal 20.

Image Process During Display of Color Image on External Display Device

Figure 9:
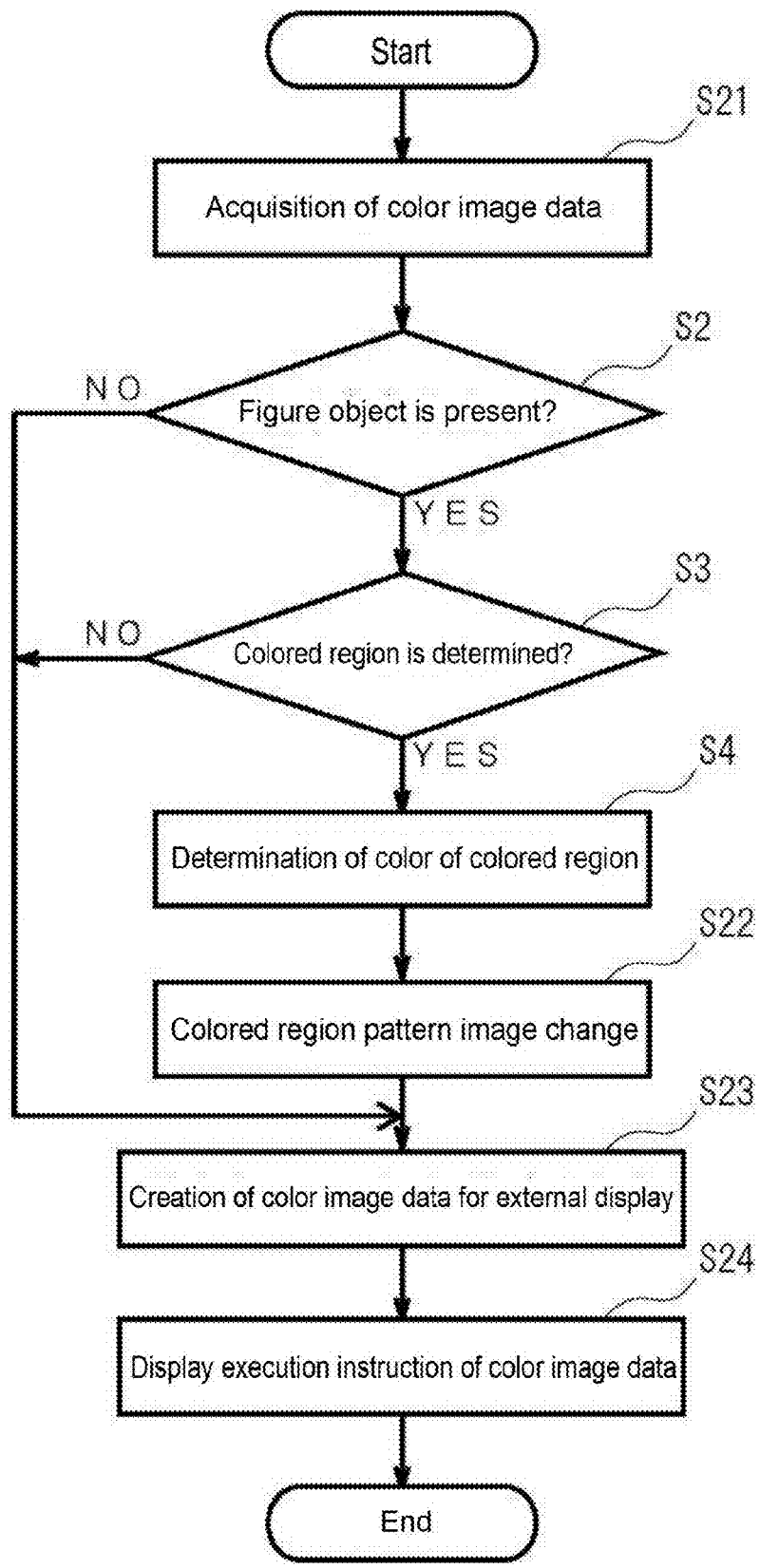
FIG. 9 illustrates steps of an image process on a color image of external display target by the information processing terminal according to Embodiment 2.

FIG. 9 illustrates steps of the image process during a color image display on the external display device 40. Here, the embodiment has a basic process flow in common with Embodiment 1 (see FIG. 3). Therefore, like reference numerals designate corresponding process steps throughout FIG. 3 and FIG. 9, and the repeated description will be omitted correspondingly.

The image process of FIG. 9 is started when the display instruction accepting unit 251 accepts the display instruction of color image from a user and the change setting has been made. If the external display device 40 has already displayed the color image, the image process is started when the change setting is made.

Upon start of the image process of FIG. 9, first, at Step S21, "Acquisition of color image data" is performed. In this process at Step S21, the display instruction accepting unit 251 acquires the color image data that the user instructs display on the external display device 40.

Thus, when Step S21 is completed, the process proceeds to Step S2. Then, the processes sequentially proceed to Steps S3 and S4. That is, at Step S2, a figure object (image part such as tables and graph images) is determined from the input color image data. At Step S3, the colored regions are determined targeting the figure object. At Step S4, the colors of colored regions determined at Step S3 are determined.

Figure 10:
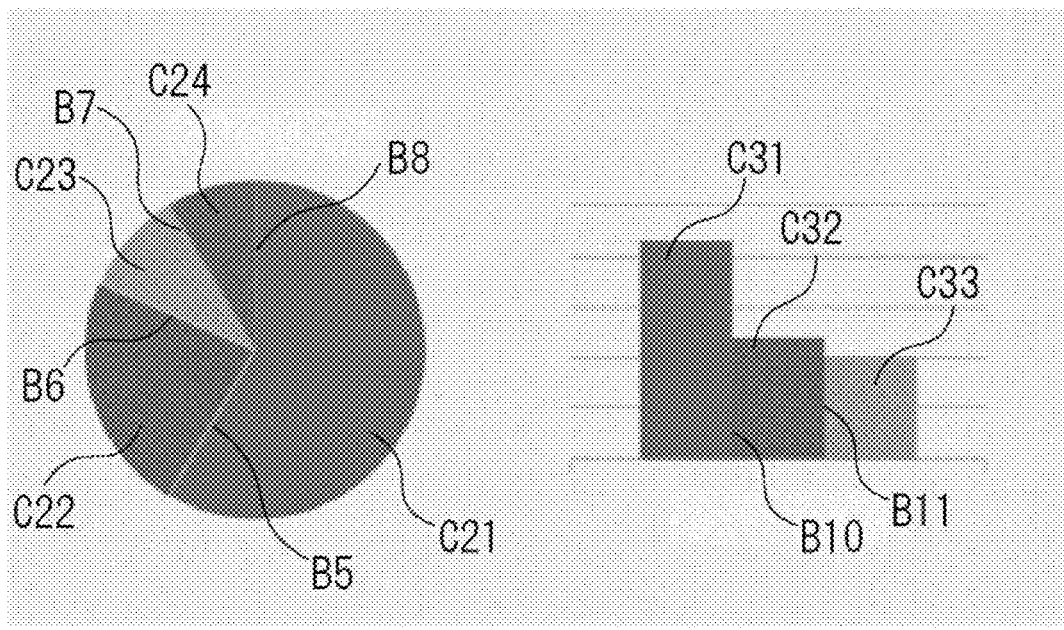
FIG. 10 illustrates a pie chart and a bar graph with the colored regions to which the image process according to Embodiment 2 is to be applied.

FIG. 10 illustrates a pie chart and a bar graph with colored regions to which the image process of FIG. 9 is to be applied. In the examples of FIG. 10, at Step S2, the pie chart and the bar chart of FIG. 10 are determined as figure objects. At Step S3, for the pie chart, the colored regions C21, C22, C23, and C24 are determined, while for the bar chart, the colored regions C31, C32, and C33 are determined. Further, at Step S4, in the case of the pie chart of FIG. 10, colors of the colored regions C21 to C24, boundaries B5, B6, B7, and B8 between the colored regions, and the adjacent colored regions sandwiching the respective boundaries are determined. Similarly, for the bar chart of FIG. 10, colors of the colored regions C31 to C33, boundaries B10 and B11 between the colored regions, and the adjacent colored regions sandwiching the respective boundaries are determined.

Thus, Steps S2 to S4 are competed, and the process proceeds to Step S22.

At Step S22, "Colored region pattern image change" is performed. At this process at Step S22, the change processor 256 adds (hatching) the patterned image with different patterns depending on the respective colors of the colored regions, with the colored regions determined by the image region determining unit 253 (see Step S3) set as the background.

Figure 11:
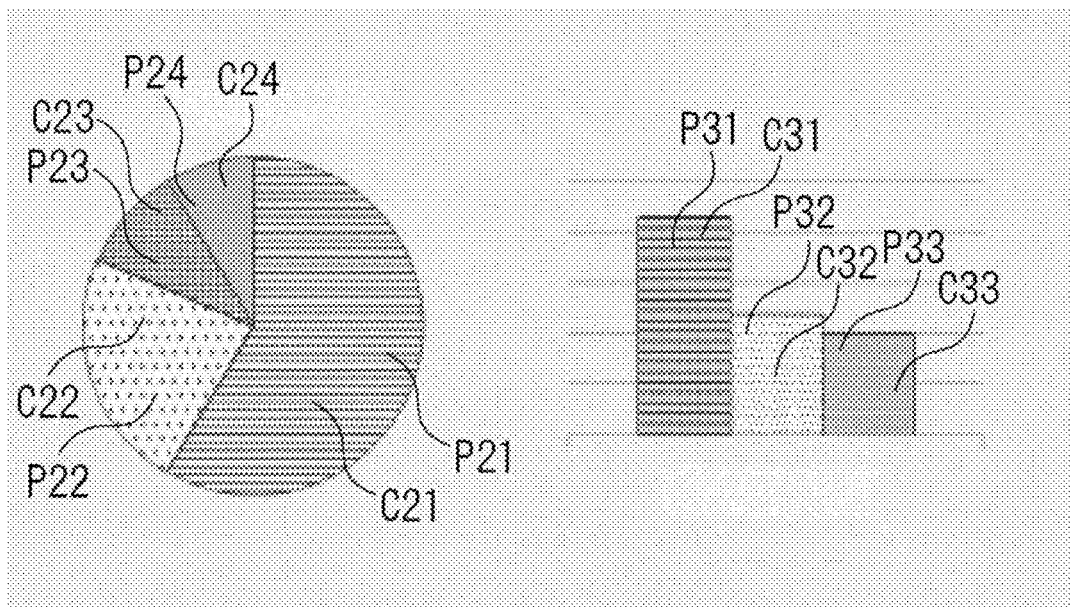
FIG. 11 illustrates a pie chart and a bar graph where the patterned regions have been added to the colored regions according to Embodiment 2.

FIG. 11 illustrates a pie chart and a bar graph where the patterned images are added to the colored regions of FIG. 10. In the examples of FIG. 11, in the pie chart, the adjacent colored regions C21, C22, C23, and C24 with different colors become patterned regions P21, P22, P23, and P24 to which different patterns have been added, respectively. In the bar chart of FIG. 11 as well, the adjacent colored regions C31, C32, and C33 with different colors become patterned regions P31, P32, and P33 to which different patterns have been added, respectively. Thus, Step S22 is competed, and the process proceeds to Step S23.

At Step S23, "Generation of color image data for external display" is performed. In this process at Step S23, based on the image data to which the patterns are added to the backgrounds of the colored regions at Step S22, the change processor 256 generates the color image data for external display to be displayed on the external display device 40. Thus, Step S23 is completed, and the process proceeds to Step S24.

At Step S24, "Display execution instruction of color image data" is performed. In this process at Step S24, the display execution instruction unit 257 instructs execution of the display output of the color image data for external display, which is generated at Step S23, to the external display device 40, which is the output destination.

Accordingly, the external display device 40, which is the output destination, can perform the display output that projects the color image to which the pattern information is added to the backgrounds of the colored regions based on the color image data for external display on the screen.

Comparison of Display Results of Color Image

Figure 12:
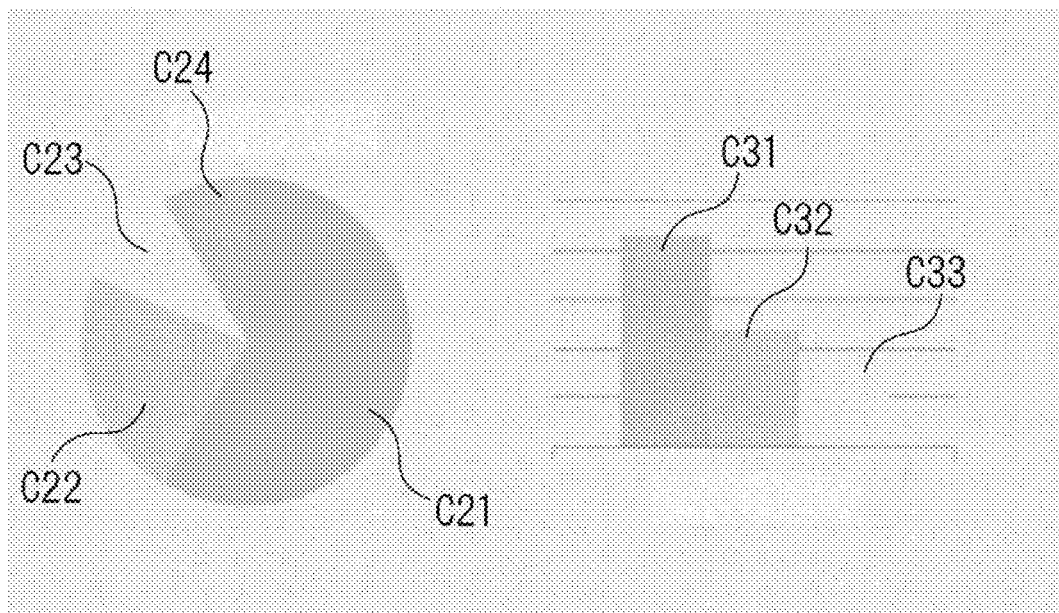
FIG. 12 illustrates display examples of when the pie chart and the bar graph according to Embodiment 2 are displayed as usual.
Figure 13:
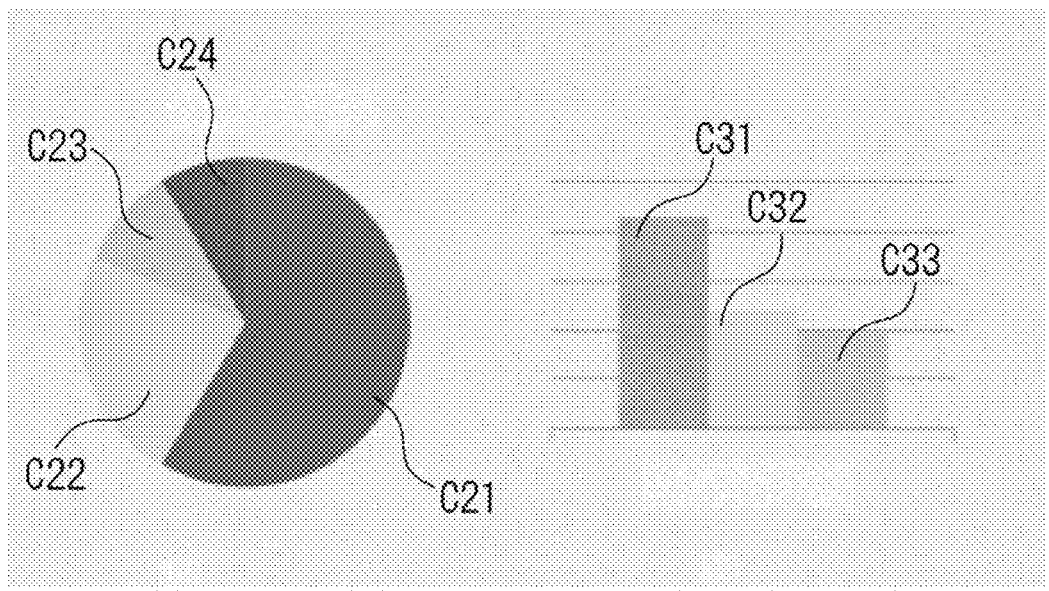
FIG. 13 illustrates other display examples of when the pie chart and the bar graph according to Embodiment 2 are displayed as usual.

FIG. 12 and FIG. 13 illustrate display examples of when the graphs of FIG. 10 are displayed without performing the image process of the embodiment. Like FIG. 12 and FIG. 13, if the image process of the embodiment is not performed, the tint becomes thin or dense depending on display capability of the external display device 40, which is the output destination. Thus, identification of the colored regions may be difficult.

In contrast to this, in the embodiment, the colored regions C21, C22, C23, and C24 with different colors in the pie chart of FIG. 10 become the patterned regions P21, P22, P23, and P24 as illustrated in FIG. 11.

The bar chart of FIG. 10 is also constituted with the patterned regions P31, P32, and P33 similarly to FIG. 11.

In view of this, the embodiment ensures identification of the patterned regions P21, P22, P23, and P24 and the patterned regions P31, P32, and P33 from one another.

Effects of Embodiment 2

To display the figure object such as a graph in color image on the external display device 40, which is an output destination, as the color image, the embodiment changes the colored regions to the patterned regions where the patterns are added while the colors remain intact. This ensures easily recognizing the difference of colors of the respective colored regions by patterns while recognizing the original color codes.

This embodiment ensures causing, for example, a color-vision impairment, to recognize identification by difference of colors. In this case, the embodiment can be employed for display of color images on the display unit 21 of the information processing terminal 20.

This embodiment includes the change process setting unit 258 that sets whether the change processor 256 changes the colored regions to the patterned regions or not.

Therefore, the following are ensured. The change setting to perform the change process from the colored regions to the patterned regions on all color images displayed on the external display device 40 can be preliminary configured. When the color codings are difficult to be identified, for example, while the external display device 40 displays the color image, the change process can be performed as necessary. Besides, the operations and effects similar to the above-described Embodiment 1 can also be achieved.

Others

The embodiments of the disclosure are described above, it will be appreciated that the disclosure will not be limited to the embodiments described above, but various modifications are possible.

For example, the image processing apparatus of the disclosure is applicable to the external display device 40 of Embodiment 2. That is, the colored regions in the color image data received from the information processing terminal 20 are supposed to be changed to the patterned regions at the external display device 40.

The image processing apparatus of the disclosure may be applicable to both the information processing terminal 20 and the external display device 40 of Embodiment 2. In this case, for example, if a monitor image of color image at the information processing terminal 20 is seen differently from the projection image at the external display device 40, any one of the information processing terminal 20 or the external display device 40 can change the colored regions in the color image data to the patterned regions. This ensures switching such that a pattern change effect of the colored regions can be selectively obtained at the information processing terminal 20 side or the external display device 40 side, thus ensuring flexible system configuration.

The disclosure may constitute the figure object with the colored regions to be changed to the patterned regions to an object of lines constituting a table and characters or an object of vector image.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image processing apparatus, comprising:
    an image region determining unit configured to determine a colored region where an inside of an outline is filled with a single color from color image data;
    an image color determining unit configured to determine a color of the colored region determined by the image region determining unit;
    a boundary determining unit configured to determine a boundary between the adjacent colored regions based on brightness and saturation of colors of the colored regions; and
    a change processor configured to
       change the colored region determined by the image region determining unit to a patterned region with a pattern different in each of the colors determined by the image color determining unit,
       when the colored regions with different colors are adjacent, change the adjacent colored regions to the patterned regions, and
       when differences in brightness and saturation of the adjacent colored regions whose boundary has been determined by the boundary determining unit are below a threshold, change the adjacent colored regions to the respective patterned regions.

2. The image processing apparatus according to claim 1, further comprising:
    a change process setting unit configured to set whether the change processor changes the colored region to the patterned region or not.

3. An image processing apparatus comprising:
    a type determining unit configured to determine a type of an object included in color image data;
    an image region determining unit configured to
       determine a colored region where an inside of an outline is filled with a single color, from the color image data, and
       when the type determined by the type determining unit is a figure object, determine the colored region in the figure object;
    an image color determining unit configured to determine a color of the colored region determined by the image region determining unit; and
    a change processor configured to change the colored region determined by the image region determining unit to a patterned region with a pattern different in each of the colors determined by the image color determining unit.

4. An image processing apparatus comprising:
    a print instruction accepting unit configured to accept a single-color print instruction based on color image data;
    an image region determining unit configured to
       determine a colored region where an inside of an outline is filled with a single color, from the color image data, and
       determine the colored region based on the single-color print instruction;
    an image color determining unit configured to determine a color of the colored region determined by the image region determining unit; and
    a change processor configured to
       change the colored region determined by the image region determining unit to a patterned region with a pattern different in each of the colors determined by the image color determining unit, and generate single-color image data where the colored region is replaced by the patterned region with the pattern different in each of the colors.

5. An image processing apparatus comprising:
a display instruction accepting unit configured to accept a colored region pattern addition display instruction based on color image data;
an image region determining unit configured to
   determine a colored region where an inside of an outline is filled with a single color, from the color image data, and
   determine the colored region based on the colored region pattern addition display instruction;
an image color determining unit configured to determine a color of the colored region determined by the image region determining unit;
a change processor configured to
   change the colored region determined by the image region determining unit to a patterned region with a pattern different in each of the colors determined by the image color determining unit, and
   generate color image data where the patterned region with the pattern different in each of the colors is added to a background of the colored region.

6. A method for image processing, comprising:
determining, via an image region determining unit, a colored region where an inside of an outline is filled with a single color from color image data;
determining, via an image color determining unit, a color of the colored region determined by the determining of the colored region;
determining, via a boundary determining unit, a boundary between the adjacent colored regions based on brightness and saturation of colors of the colored regions; and
via a change processor,
   changing the colored region determined by the determining of the colored region to a patterned region with a pattern different in each of the colors determined by the determining of the color,
   when the colored regions with different colors are adjacent, changing the adjacent colored regions to the patterned regions, and
   when differences in brightness and saturation of the adjacent colored regions whose boundary has been determined by the boundary determining unit are below a threshold, changing the adjacent colored regions to the respective patterned regions.

7. A non-transitory computer-readable recording medium storing an image processing program, the image processing program causing a computer to function as:
an image region determining unit that determines a colored region where an inside of an outline is filled with a single color from color image data;
an image color determining unit that determines a color of the colored region determined by the image region determining unit;
a boundary determining unit that determines a boundary between the adjacent colored regions based on brightness and saturation of colors of the colored regions; and
a change processor that
   changes the colored region determined by the image region determining unit to a patterned region with a pattern different in each of the colors determined by the image color determining unit,
   when the colored regions with different colors are adjacent, changes the adjacent colored regions to the patterned regions, and
   when differences in brightness and saturation of the adjacent colored regions whose boundary has been determined by the boundary determining unit are below a threshold, changes the adjacent colored regions to the respective patterned regions.

* * * * *